(12) United States Patent
Abdel Khalek et al.

(10) Patent No.: US 10,243,631 B2
(45) Date of Patent: Mar. 26, 2019

(54) METHOD AND APPARATUS FOR PERFORMING DISTRIBUTED COMPUTATION OF PRECODING ESTIMATES

(71) Applicant: FREESCALE SEMICONDUCTOR, INC., Austin, TX (US)

(72) Inventors: Amin Abdel Khalek, San Diego, CA (US); Samuel Kerhuel, Villeneuve Tolosane (FR); Wim Joseph Rouwet, Austin, TX (US)

(73) Assignee: NXP USA, Inc., Austin, TX (US)

( * ) Notice: Subject to any disclaimer, the term of this patent is extended or adjusted under 35 U.S.C. 154(b) by 184 days.

(21) Appl. No.: 15/299,041

(22) Filed: Oct. 20, 2016

(65) Prior Publication Data

US 2017/0359108 A1     Dec. 14, 2017

(30) Foreign Application Priority Data

Jun. 8, 2016   (EP) ..................................... 16305667

(51) Int. Cl.

| | |
|---|---|
| *H04W 72/08* | (2009.01) |
| *H04B 7/0456* | (2017.01) |
| *H04B 7/022* | (2017.01) |
| *H04B 7/0452* | (2017.01) |
| *H04W 88/08* | (2009.01) |

(52) U.S. Cl.
CPC ........... *H04B 7/0456* (2013.01); *H04B 7/022* (2013.01); *H04B 7/0452* (2013.01); *H04W 88/085* (2013.01)

(58) Field of Classification Search
CPC .................................. H04B 7/04; H04B 7/02
See application file for complete search history.

(56) References Cited

U.S. PATENT DOCUMENTS

| | | | |
|---|---|---|---|
| 8,160,121 B2 | 4/2012 | Forenza et al. | |
| 8,396,368 B2 | 3/2013 | Tarlazzi et al. | |
| 2010/0237944 A1 | 9/2010 | Pierdomenico et al. | |
| 2011/0164526 A1* | 7/2011 | Zhu ....................... | H04L 5/0023 370/252 |

(Continued)

OTHER PUBLICATIONS

U.S. Appl. No. 14/707,179, inventor Birarna Goumballa, "Charge Pump Apparatus, Phase-Locked Loop, and Method of Operating a Charge Pump Apparatus", filed May 8, 2015, Office Action—Notice of Allowance, dated Oct. 30, 2017.

*Primary Examiner* — Brandon M Renner

(57) ABSTRACT

A method and apparatus for performing distributed computation of precoding estimates within a DAS. An RRH comprises a receiver component arranged to receive uplink signals from active user devices. The RRH further comprises a processing component arranged to perform channel estimation for each active user device m, based on the received uplink signals, to obtain channel estimates $H_{m,i}$ between each active user device m and the RRH, compute intra-RRH interference precoding estimates $F_m$ for each active user device m based on the channel estimates $H_{m,i}$, and solve interference-free conditions to obtain inter-RRH interference precoding estimates for each RRH j within the DAS.

17 Claims, 4 Drawing Sheets

(56) References Cited

U.S. PATENT DOCUMENTS

| | | | |
|---|---|---|---|
| 2012/0294162 A1* | 11/2012 | Pajukoski | H04B 7/024 370/252 |
| 2012/0327800 A1* | 12/2012 | Kim | H04W 72/082 370/252 |
| 2014/0011535 A1* | 1/2014 | Jeon | H04W 52/40 455/522 |
| 2014/0064394 A1 | 3/2014 | Wang et al. | |
| 2014/0274085 A1* | 9/2014 | Kwak | H04L 5/0037 455/450 |
| 2014/0341144 A1* | 11/2014 | Zhang | H04L 5/006 370/329 |
| 2015/0326296 A1* | 11/2015 | Thiele | H04B 7/024 370/328 |
| 2015/0341814 A1* | 11/2015 | Yu | H04B 7/04 370/252 |
| 2016/0315674 A1* | 10/2016 | Li | H04B 7/0413 |
| 2017/0187504 A1* | 6/2017 | Qian | H04L 5/0048 |
| 2017/0201340 A1* | 7/2017 | Yum | H04J 13/0048 |

* cited by examiner

METHOD AND APPARATUS FOR PERFORMING DISTRIBUTED COMPUTATION OF PRECODING ESTIMATES

FIELD

This invention relates to a method and apparatus for performing distributed computation of precoding estimates within a distributed antenna system.

BACKGROUND

Remote radio heads (RRHs) are becoming heavily deployed in modern communication systems to function as front-end devices for performing digital antenna processing as well as analogue radio frequency (RF) functions. The main use of RRHs is to serve as subsystems of a distributed antenna system (DAS), such as illustrated in FIG. 1. Compared to a centrally located base station antenna system, a DAS offers the advantage of a uniformly high capacity due to the higher density of RRHs in comparison to a centralized macro cell base station, and substantially eliminates coverage holes due to the shorter distance from the average user to the closest RRH.

FIG. 2 illustrates a simplified block diagram of a MIMO (multiple input multiple output) DAS 200. The base station controller 210 performs bit-level processing including channel coding, scrambling and interleaving, followed by modulation of data to be transmitted to produce scrambled and modulated codewords. Layer mapping is then performed on the scrambled and modulated codewords to create a multitude of parallel data streams intended for transmission to one or more users. Subsets of the parallel data streams are then transmitted (via wired or point-to-point wireless interfaces) to multiple RRHs 220. Each RRH 220 is capable of performing digital processing on the received subset of data streams followed by digital to analogue conversion and analogue processing before the subset of data streams are finally transmitted via an antenna subsystem. Accordingly, within such a MIMO DAS 200, multiple RRHs may be transmitting data streams substantially simultaneously, resulting in a high potential for inter-RRH interference.

In order to avoid inter-RRH interference, it is known to perform precoding of the data streams prior to the data streams being transmitted to the RRHs 220. Such precoding enables the signals transmitted by the RRHs to include interference cancellation components that cancel out inter-RRH interference at the receiving user equipment. Conventionally, such precoding is performed centrally at the base station controller 210. However, such centralised precoding requires channel feedback relating to each RRH antenna from all RRHs to be sent to the base station controller via the wired or point-to-point wireless interfaces, which requires a significant communication channel overhead between the base station controller and each RRH. This communication channel overhead becomes prohibitive in massive MIMO architectures, which can consist of up to 256 antennas.

SUMMARY

The present invention provides a remote radio head apparatus, a distributed antenna system and a method of performing distributed computation of precoding estimates as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

There is provided a method and apparatus for performing distributed computation of precoding estimates within a distributed antenna system. In particular, and as described in greater detail below, each remote radio head apparatus (RRH) within the distributed antenna system is arranged to use channel estimates between itself and active user devices to firstly determine intra-RRH interference precoding to be performed on user device data streams by the respective RRH. Each RRH is then arranged to use its respective channel estimates and intra-RRH interference precoding estimates to solve interference-free conditions to derive a part of the inter-RRH interference precoding to be applied centrally by a base station controller. Each RRH communicates the part inter-RRH interference precoding derived thereby back to the base station controller, which is then able to combine the inter-RRH interference precoding parts received from the RRHs to obtain a complete inter-RRH interference matrix P to be applied to user device data streams.

Advantageously, for the proposed method and apparatus the RRHs are not required to send channel information to the base station controller, thereby enabling the communication channel overhead between the base station controller and each RRH to be significantly reduced, since the inter-RRH interference precoder parts computed locally at each RRH will be significantly smaller in size than a full channel matrix corresponding to every user device for the respective RRH. In addition, it does not require any information exchange between RRHs.

Figure 1:
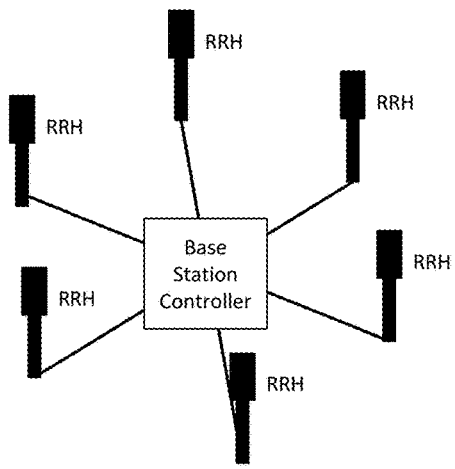
FIG. 1 schematically illustrates a distributed antenna system.
Figure 2:
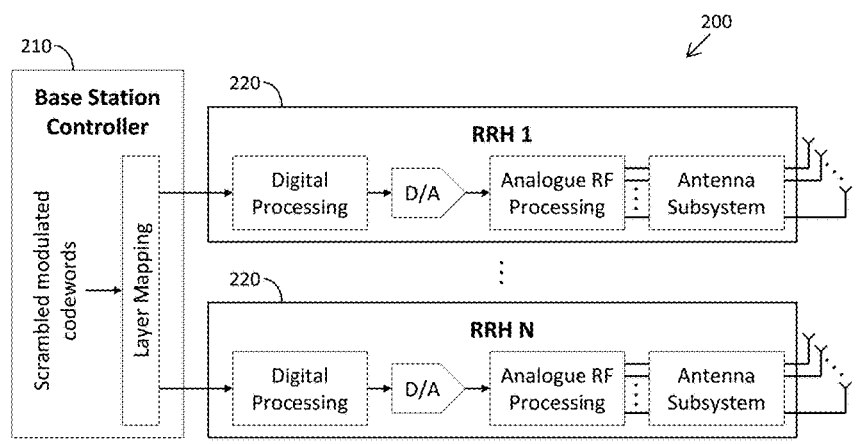
FIG. 2 illustrates a simplified block diagram of a MIMO distributed antenna system.
Figure 3:
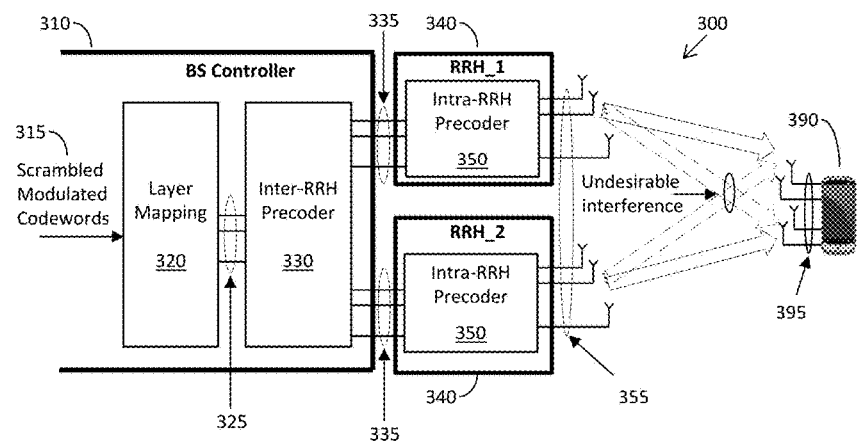
FIG. 3 illustrates a simplified block diagram of an example of a part of a MIMO distributed antenna system according to some examples of the present invention.

Referring now to FIG. 3, there is illustrated a simplified block diagram of an example of a part of a multiple input multiple output (MIMO) distributed antenna system (DAS) 300. The DAS 300 includes a base station controller 310 and a plurality (two of which are illustrated in FIG. 3) of remote radio head apparatuses (RRHs) 340. In order to avoid inter-RRH interference, whilst minimizing the communication channel overhead between the base station controller and each RRH 340, it is desirable to perform the precoding computation and application locally at the RRHs 340 because of the proximity to the physical antennas facilitates channel estimation and eliminates the overhead of communicating channel estimates to a central base station. However, the individual RRHs 340 have no visibility of channel estimations for other RRHs 340 within the system. As such, the RRHs 340 are not capable of performing effective local inter-RRH interference precoding in isolation (i.e. without at least some inter-RRH cooperation).

In accordance with some example embodiments of the present invention, it is proposed to perform a first, inter-RRH interference precoding prior to sending data streams to the RRHs 340. A second, intra-RRH interference precoding may then be performed locally at each RRH 340. In particular, and as described in greater detail below, different parts of the inter-RRH interference precoding may be computed in a distributed manner at the RRHs 340 and communicated back to the base station controller 310. Each RRH 340 is further able to derive its own channel estimates, and use these RRH-specific channel estimates to compute intra-RRH interference precoding to:
  eliminate inter-stream interference for a given user device;
  maximize RRH capacity; or
  a combination of the above.

Advantageously, this proposed approach to implementing precoding within the DAS 300 has the significant benefit of eliminating the need for channel information from all RRHs 340 to be sent to the base station controller 310, thereby enabling the communication channel overhead between the base station controller 310 and each RRH 340 to be significantly reduced, since the inter RRH interference precoder components computed locally at each RRH 340 will be significantly smaller in size than a full channel matrix corresponding to every user device. In addition, it does not require any information exchange between RRHs 340.

Accordingly, the base station controller 310 includes a layer mapping component 320 arranged to receive scrambled and modulated codewords 315, and perform layer mapping on the received scrambled and modulated codewords 315 to create a multitude of parallel data streams 325 intended for transmission to one or more users devices, such as the user device 390. In the example illustrated in FIG. 3, the base station controller 310 further includes an inter-RRH interference precoder component 330. The inter-RRH interference precoder component 330 is arranged to perform a first precoding on subsets 335 of the parallel data streams 325 prior to transmitting the subsets 335 of the parallel data streams to the RRHs 340.

Each RRH 340 includes an intra-RRH interference precoder component 350 arranged to perform the second precoding on the subset 335 of the parallel data streams received by the respective RRH 340. In some examples, the intra-RRH interference precoder components 350 of the RRHs 340 may be implemented within a digital processing functionality of the RRHs 340. The RRHs 340 may further perform digital to analogue conversion and analogue processing of the respective subsets of precoded data streams before the data streams are finally transmitted via an antenna subsystem to one or more user devices, such as the user device 390.

For simplicity and ease of understanding, we take the case of a single user MIMO (multiple input multiple output) DAS 300 having two RRHs 340, where the data streams transmitted by the different RRHs 340 are intended for the same user device 390. The parallel data streams 325 intended for transmission to the user device 390 may be represented by the vector s:

$$s = \begin{bmatrix} s_1^1 \\ \vdots \\ s_{i_1}^1 \\ s_1^2 \\ \vdots \\ s_{i_2}^2 \end{bmatrix}$$

where $s_i^1$ represent the subset of i data streams to be transmitted by the first RRH 340, and $s_j^2$ represent the subset of j data streams to be transmitted by the second RRH 340.

The inter-RRH interference precoding performed by the inter-RRH interference precoder component 330 may be represented by the matrix P:

$$P = \begin{bmatrix} P_{11} & P_{12} \\ P_{21} & P_{22} \end{bmatrix}$$

where $P_{11}$ and $P_{22}$ represent the mapping of the data streams to their intended RRH 340, and $P_{12}$ and $P_{21}$ represent the mapping of the data streams to the other RRH 340 to enable over-the-air inter-RRH interference cancellation.

The intra-RRH interference precoding performed by each intra-RRH interference precoder component 350 may be represented by the matrix $F_i$:

$$F_i = \begin{bmatrix} F_{i1} & 0 \\ 0 & F_{i2} \end{bmatrix}$$

where F is a hypothetical block diagonal precoder matrix for which the individual diagonal components $F_{i1}$ and $F_{i2}$ represent the intra-RRH interference precoding applied at each of the RRHs 340.

Accordingly, the combined transmitted signals 355 from the RRHs 340, expressed as 'x', may be represented by the equation:

$$x = \begin{bmatrix} x_1^1 \\ \vdots \\ x_{i_1}^1 \\ x_1^2 \\ \vdots \\ x_{i_2}^2 \end{bmatrix} = FPs$$

where $x_i^1$ represent the subset of i signals transmitted by the first RRH 340, and $x_j^2$ represent the subset of j signals transmitted by the second RRH 340.

Conversely, the combined signals 395 received at the user device 390, expressed as 'y', may be represented by the equation:

$$y = Hx + n \qquad \text{Equation 2}$$

where H represents the full downlink channel ($N_{tx} \times N_{rx}$) matrix between all RRHs 340 and the user device 390, and n represents an $N_{rx}$ noise vector. The downlink channel ($N_{tx} \times N_{rx}$) matrix H may be written as:

$$H = \begin{bmatrix} H_{11} & H_{12} \\ H_{21} & H_{22} \end{bmatrix}$$

In the ideal case where $H_{12} = H_{21} = 0$, it follows that $P_{12} = P_{21} = 0$ since no inter-RRH interference exists. In more general interfering scenarios, $P_{12}$ and $P_{21}$ are devised such that the mixing of the corresponding signals transmitted by the two RRHs 340 eliminates the inter-RRH interference during the over-the-air transmission.

Expanding Equation 2 above, we obtain:

$$y = \begin{bmatrix} H_{11} & H_{12} \\ H_{21} & H_{22} \end{bmatrix} \begin{bmatrix} F_1 & 0 \\ 0 & F_2 \end{bmatrix} \begin{bmatrix} P_{11} & P_{12} \\ P_{21} & P_{22} \end{bmatrix} s \qquad \text{Equation 3}$$

$$= \begin{bmatrix} H_{11}F_1P_{11} + H_{12}F_2P_{21} & H_{11}F_1P_{12} + H_{12}F_2P_{22} \\ H_{21}F_1P_{11} + H_{22}F_2P_{21} & H_{21}F_1P_{12} + H_{22}F_2P_{22} \end{bmatrix} s \qquad \text{Equation 4}$$

The two diagonal blocks ($H_{11}F_1P_{11} + H_{12}F_2P_{21}$) and ($H_{21}F_1P_{12} + H_{22}F_2P_{22}$) represent the desired signals at the user device, and the off-diagonal blocks ($H_{21}F_1P_{11} + H_{22}F_2P_{21}$) and ($H_{11}F_1P_{12} + H_{12}F_2P_{22}$) represent the inter-RRH interference at the user device 390. Thus, the interference-free conditions can be written as:

$$H_{11}F_1P_{12} + H_{12}F_2P_{22} = 0 \qquad \text{Equation 5}$$

$$H_{21}F_1P_{11} + H_{22}F_2P_{21} = 0 \qquad \text{Equation 6}$$

In order to minimize communication channel overhead between the base station controller 310 and each RRH 340, it is proposed to compute the parameter values H, F and P that achieve interference-free conditions at the RRHs 340, and to communicate only the inter-RRH interference precoding values P back to the base station controller 310. Advantageously, such an approach avoids the need to communicate channel estimates for the full downlink channel matrix H from the RRH 340 to the base station controller 310, achieving a communications overhead reduction in the order of size (H)/size (P) on each subcarrier, which in a typical LTE (Long Term Evolution) Release 13 massive MIMO system can be as high as a factor of 16, depending on the number of data streams and the number of antennas.

In particular, it is proposed to take advantage of the proximity of each RRH 340 to the respective physical antenna system to enable channel estimation to be performed independently at each RRH 340, and to use the independently derived channel estimates to compute the precoder values P and F at the RRHs 340 in a distributed manner. The computed inter-RRH interference precoder values P may then be communicated back to the base station controller 310.

Performing channel estimation independently at each RRH 340 implies that the channel estimates $H_{11}$ and $H_{21}$ will be derived by the first RRH_1 340, whilst the channel estimates $H_{12}$ and $H_{22}$ will be derived by the second RRH_2 340. In a TDD (Time Division Duplex) system, channel reciprocity is ensured. Accordingly, in a TDD system, each RRH 340 is able to perform channel estimation on uplink signals (from the user device 390), and to derive the corresponding downlink channel estimates from the channel estimates for the respective uplink signals. Since the uplink signal received at RRH_1 is a combination of the response for the channels $H_{11}$ and $H_{21}$, the channels cannot be distinguished and individually estimated on the same time-frequency resources. Thus, to avoid the detrimental impact of interference on channel estimation, the transmit antennas corresponding to $H_{11}$ and $H_{21}$ could be arranged to use different pilot subcarriers in the uplink transmission, and similarly for $H_{12}$ and $H_{22}$. This enables estimating $H_{11}$ and $H_{21}$ on RRH_1, and $H_{12}$ and $H_{22}$ on RRH_2 using least squares or MMSE (minimum mean square estimation) channel estimation. Alternatively, a different cyclic shift could be used for the different channels, such as used with LTE SRS (Sounding Reference Signal), or using orthogonal cover codes (OCC) such as used with LTE PUSCH (Physical Uplink Shared CHannel).

However, neither of the RRHs 340 will have visibility of the channel estimates derived by the other RRH 340. Similarly, neither of the RRHs 340 will have visibility of the intra-RRH interference precoding estimates F derived by the other RRH 340. Accordingly, in order to make resolving the interference-free conditions defined above in Equations 5 and 6 feasible at the RRHs 340, they are reduced into the following set of four sub-conditions:

$$H_{11}F_1P_{12} = 0 \qquad \text{Equation 7}$$

$$H_{12}F_2P_{22} = 0 \qquad \text{Equation 8}$$

$$H_{21}F_1P_{11} = 0 \qquad \text{Equation 9}$$

$$H_{22}F_2P_{21} = 0 \qquad \text{Equation 10}$$

Significantly, the channel estimates $H_{11}$ and $H_{21}$ and the intra-RRH interference precoding estimate $F_1$ are all capable of being derived by RRH_1 340. Consequently, RRH_1 340 is able to resolve Equations 7 and 9 to obtain the inter-RRH interference precoding estimates $P_{12}$ and $P_{11}$. Furthermore, the channel estimates $H_{12}$ and $H_{22}$ and the intra-RRH interference precoding estimate $F_2$ are all capable of being derived by RRH_2 340. Consequently, RRH_2 340 is able to resolve Equations 8 and 10 to obtain the inter-RRH interference precoding estimates $P_{22}$ and $P_{21}$. Thus, by reducing the original interference-free conditions of Equations 5 and 6 into these four sub-conditions of Equations 7 to 10, the entire precoding computation is able to be performed at the RRHs 340 in a distributed manner. Specifically, each RRH 340 is able to compute a row $P_{RRH}$ of the inter-RRH interference precoder matrix P, and to communicate the computed row back to the base station controller 310. The base station controller 310 is then able to combine the pre-computed inter-RRH interference precoding rows $P_{RRH}$ received from the RRHs 340 to obtain the full inter-RRH interference precoder matrix P, which can then be applied to the parallel data streams 325 by the inter-RRH interference precoder component 330 prior to transmitting the subsets 335 of the parallel data streams to the RRHs 340.

Equations 7 and 9 may be further generalised for cases involving more than two RRHs 340 as follows:

$$H_{ij}F_jP_{j,k} = 0 \; \forall i = 1 \text{ to } N_{RRH}$$

$$j = 1 \text{ to } N_{RRH}$$

$$k = 1 \text{ to } N_{RRH}, k \neq i \qquad \text{Equation 11}$$

The computation of the inter-RRH interference precoding estimate $P_{j,(i+k)modN_{RRH}}$ requires the intra-RRH interference precoding estimate $F_j$ to be computed first, based on the channel estimate $H_{ij}$. As outlined above, the channel estimate $H_{ij}$ may be derived by the RRH$_i$ 340 using least squares or MMSE (minimum mean square estimation) channel estimation based on uplink signals from the user device 390 using different pilot subcarriers in the uplink transmission from each transmit antenna of the respective user device to avoid the detrimental impact of interference on channel estimation.

Having obtained the channel estimate $H_{ij}$, the intra-RRH interference precoding estimates $F_j$ may be computed. To maximise the capacity of the channel transmission, the intra-RRH interference precoding estimates $F_j$ may be computed using singular value decomposition (SVD). In this approach, the channel matrix H is diagonalised by taking an SVD and removing the two unitary matrices through pre- and post-multiplication at the transmitter and receiver, respectively. Then, one data stream per singular value can be transmitted with power loading according to the singular values without creating any interference.

In the simplified case of a single user MIMO DAS 300 having two RRHs 340, given the channel channel matrices $H_{11}$ and $H_{22}$, the channel can be decomposed as follows:

$$H_{11}=U_1\Sigma_1 V_1^H \qquad \text{Equation 12}$$

$$H_{22}=U_2\Sigma_2 V_2^H \qquad \text{Equation 13}$$

where $U_1$ and $U_2$ are unitary matrices representing the left singular vectors, $V_1^H$ and $V_2^H$ are unitary matrices representing the right singular vectors, while $\Sigma_1$ and $\Sigma_2$ are diagonal matrices with non-negative real entries corresponding to the singular values. Note that $A^H$ for any matrix A is the Hermitian transpose or conjugate transpose of A.

SVD precoding involves deriving the intra-RRH interference precoder estimates $F_1$ and $F_2$ as follows:

$$F_1=V_1\Sigma_1 \qquad \text{Equation 14}$$

$$F_2=V_2\Sigma_2 \qquad \text{Equation 15}$$

It should be noted that $H_{11}F_1=(\Sigma_1)^2$, $H_{22}F_2=(\Sigma_2)^2$, $H_{12}F_2=H_{12}V_2\Sigma_2$, and $H_{21}F_1=H_{21}V_1\Sigma_1$.

It is contemplated that the intra-RRH interference precoding estimates $F_j$ may be computed using techniques other than singular value decomposition (SVD). For example, the intra-RRH interference precoding estimates $F_j$ may be computed using maximum ratio combining/transmit (MRC/MRT), zero forcing, minimum mean square error, etc.

Having derived the intra-RRH interference precoder estimates $F_j$, the interference-free conditions (as defined for the general case by Equation 11) can be solved using the knowledge of the individual blocks of F and H. In particular, solving for $H_{ij}F_jP_{j,(i+k)modN_{RRH}}=0$ is equivalent to identifying the singular vector corresponding to the zero singular values, i.e. populating the vectors of the inter-RRH interference precoding estimate $P_{j,(i+k)modN_{RRH}}$ such that it exists in the null space of $H_{ij}F_j$. For instance, to find $P_{11}$, we need to solve $H_{21}F_1P_{11}=H_{21}V_1\Sigma_1 P_{11}=0$ which involves finding the null space of $H_{21}V_1\Sigma_1$ by applying an SVD to matrix to obtain:

$$H_{21}V_1\Sigma_1=L_{11}\Lambda_{11}R_{11}^H \qquad \text{Equation 16}$$

where $L_{11}$, $\Lambda_{11}$, and $R_{11}$ are the unitary matrix of the left singular vectors, the unitary matrix of the right singular vectors, and the diagonal matrix of singular values respectively. The subscript '11' refers to the fact that the SVD is used to compute $P_{11}$. A check is then performed of the zero singular values $\Lambda_{11}[i,i]$ for $i=1, \ldots, N_s$. Without loss of generality, if $\Lambda_{11}[i,i]\approx 0$ for all $i\geq j$, $P_{11}$ can be computed in the null space to eliminate interference as follows:

$$P_{11}=R_{11}[:,j:N_s] \qquad \text{Equation 17}$$

It can be seen from the singular value decomposition that right multiplying $H_{21}V_1\Sigma_1=L_{11}\Lambda_{11}R_{11}^H$ with $R_{11}[:,j:N_s]$ will result in a matrix of zeroes due to the zero singular values j to $N_s$ and the unitary nature of the matrix $R_{11}$.

It should be noted that if the null space of the matrix has zero dimensions, i.e. no $j\leq N_s$ exists, then interference cannot be fully eliminated. In that case, an alternative formulation is to minimize interference, which could be accomplished by rewriting the interference free conditions (for the simplified case of a single user MIMO DAS 300 having two RRHs 340) defined in Equations 7 to 10 as follows:

$$P_{12}=\text{argmin}(|H_{11}F_1P_{12}|_F) \qquad \text{Equation 18}$$

$$P_{22}=\text{argmin}(|H_{12}F_2P_{22}|_F) \qquad \text{Equation 19}$$

$$P_{11}=\text{argmin}(|H_{21}F_1P_{11}|_F) \qquad \text{Equation 20}$$

$$P_{21}=\text{argmin}(|H_{22}F_2P_{21}|_F) \qquad \text{Equation 21}$$

This minimizes the Frobenius norm of the resulting interference signal as at the receiver as opposed to fully nullifying it, and may be generalised to:

$$P_{j,k}=\text{argmin}(|H_{ij}F_jP_{j,k}|_F)$$

$$\forall i=1 \text{ to } N_{RRH}$$

$$j=1 \text{ to } N_{RRH}$$

$$k=1 \text{ to } N_{RRH}, k\neq i \qquad \text{Equation 22}$$

Figure 4:
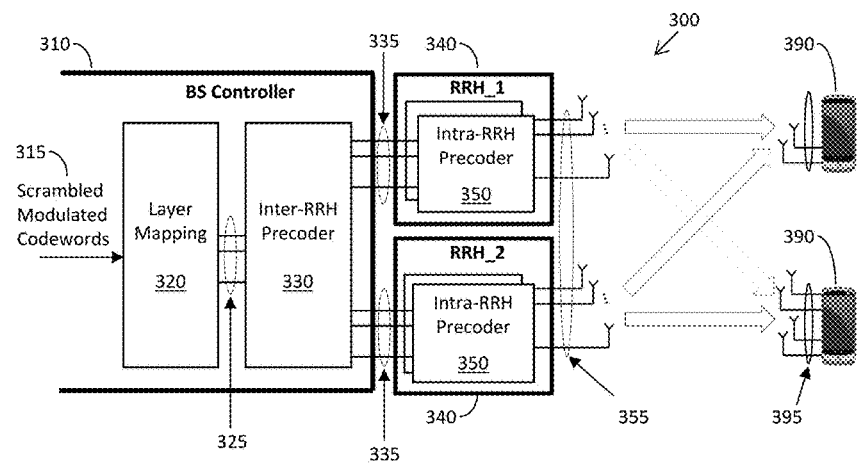
FIG. 4 illustrates a simplified block diagram of an example of a multi-user use case for MIMO distributed antenna system of FIG. 3.

FIG. 4 illustrates a simplified block diagram of an example of a multi-user use case for the MIMO DAS 300 of FIG. 3. The multi-user MIMO use case is highly relevant in practice when the combined number of antennas utilised by the base station (i.e. the combined number of antennas at the RRHs 340) is much larger than the number of antennas at each user device 390. In this case, the full capacity of the base station cannot be realized by transmitting to a single user device 390 at a time. Rather, individual user devices 390 can be served simultaneously if the base station pre-processes the data streams such that the interference from all other streams is eliminated at each user device's receiver.

In the multi-user example of FIG. 4, the combined signals 395 received at each user device 390 'm', may be represented by the equation:

$$y_m=H_m x+n_m \qquad \text{Equation 22}$$

where (for a two RRH system):

$$H_m = \begin{bmatrix} H_{m,11} & H_{m,12} \\ H_{m,21} & H_{m,22} \end{bmatrix}.$$

Each RRH 340 has multiple (1 per user device 390) intra-RRH interference precoding components 350, each of the intra-RRH interference precoding components 350 being arranged to apply intra-RRH interference precoding to data streams to be transmitted to a particular user device 390.

The intra-RRH interference precoding components 350 are arranged to apply intra-RRH interference precoding to the data streams to eliminate multiuser interference by ensuring the data streams for each user device 390 are nullified at the other receivers of the other user devices 390.

In the case of a multi-user MIMO DAS 300 having two RRHs 340, this may be expressed in the following matrix form:

$\forall m=1, \ldots M:$ $[H_{1,11}{}^T \ldots H_{m-1,11}{}^T H_{m+1,11}{}^T \ldots H_{M,11}{}^T]^T F_{1,m}=0$  Equation 22

$[H_{1,22}{}^T \ldots H_{m-1,22}{}^T H_{m+1,22}{}^T \ldots H_{M,22}{}^T]^T F_{2,m}=0$  Equation 23 where M represents the number of user devices 390.

Note how $H_{m,11}$ and $H_{m,22}$ are not included in the conditions corresponding to $F_{1,m}$ and $F_{2,m}$ but the rest of the individual user channels are. This ensures that the precoding applied to data streams for a given user device results in the user transmission occupying an interference-free subspace. Those conditions can be resolved via the standard block diagonalization (BD) approach to obtain the user block on each RRH 340, $F_{n,m}$ for all n=1, . . . , $N_{RRH}$ and m=1, . . . , M.

The inter-RRH interference precoding matrix can be constructed by solving the following conditions:

$H_{:,11} F_{1,:} P_{12} =$  Equation 24

$H_{:,12} F_{2,:} P_{22} = 0$  Equation 25

$H_{:,21} F_{1,:} P_{11} = 0$  Equation 26

$H_{:,22} F_{2,:} P_{21} = 0$  Equation 27

For multiple RRHs 340, these conditions it can be represented more generically as:

$H_{:,ij} F_{j,:} P_{j,(i+k) \bmod N_{RRH}} = 0 \, \forall i=1$ to $N_{RRH}$ $j=1$ to $N_{RRH}$ $k=1$ to $(N_{RRH}-1)$  Equation 28

This expression can be solved in the same manner as for the single user case described above, i.e. by performing an SVD on the matrix $H_{:,ij} F_{j,:}$ and selecting $P_{j,(i+k) \bmod N_{RRH}}$ in its null space.

Figure 5:
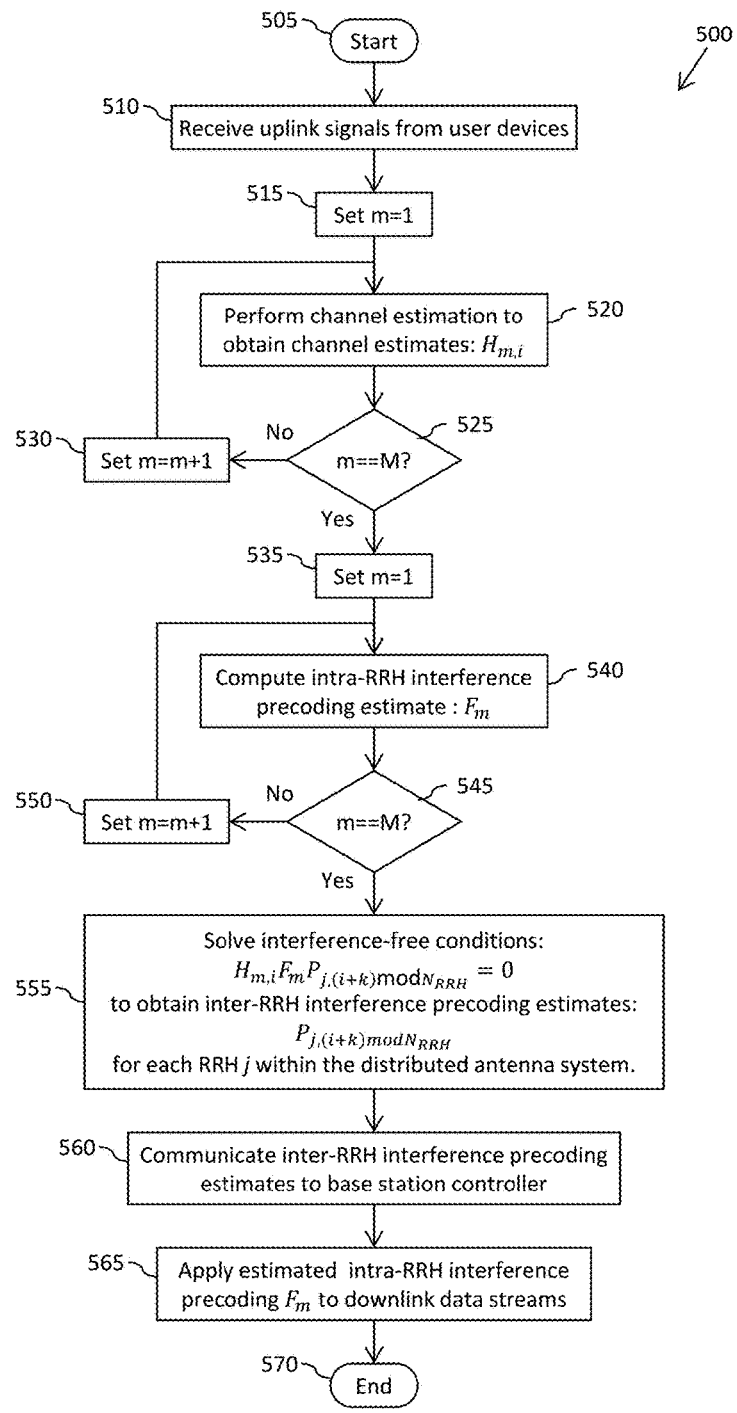
FIG. 5 illustrates a simplified flowchart of an example of a method of performing distributed computation of precoding estimates within a distributed antenna system.

Referring now to FIG. 5 there is illustrated a simplified flowchart 500 of an example of a method of performing distributed computation of precoding estimates within a distributed antenna system, such as may be implemented within the RRHs 340 of the DAS of FIGS. 3 and 4. The method starts at 505, and moves on to 510 where uplink signals are received from active user devices. A user device identifier m is initialised at 515. Channel estimation is then performed for the active user device m, based on the received uplink signals, to obtain channel estimates $H_{m,i}$ between the user device m and the RRH performing the method. It is then determined whether channel estimation has been performed for all active user devices, at 525. If it is determined that channel estimation has not been performed for all active user devices, the method moves on to 530, where the user device identifier m is incremented and the method loops back to 520.

Once it is determined that channel estimation has been performed for all active user devices at 525, the method moves on to 535 where the user device identifier m is re-initialised. An intra-RRH interference precoding estimate $F_m$ for the active user device m is then computed, at 540, based on the channel estimates $H_{m,i}$ therefor. It is then determined whether intra-RRH interference precoding estimates have been computed for all active user devices, at 545. If it is determined that intra-RRH interference precoding estimates have not been computed for all active user devices, the method moves on to 550, where the user device identifier m is incremented and the method loops back to 540.

Once it is determined that intra-RRH interference precoding estimates have been computed for all active user devices at 545, the method moves on to 555 where interference-free conditions are solved to obtain inter-RRH interference precoding estimates for each RRH within the distributed antenna system, which in the illustrated example of FIG. 5 consists of solving the interference-free conditions: $H_{m,i} F_m P_{j,(i+k) \bmod N_{RRH}} = 0$. The obtained inter-RRH interference precoding estimates are then communicated to a base station controller of the distributed antenna system, at 560. In the illustrated example, the estimated intra-RRH interference precoding $F_m$ is subsequently applied to downlink data streams for the user devices, at 565, and the method ends at 570.

Figure 6:
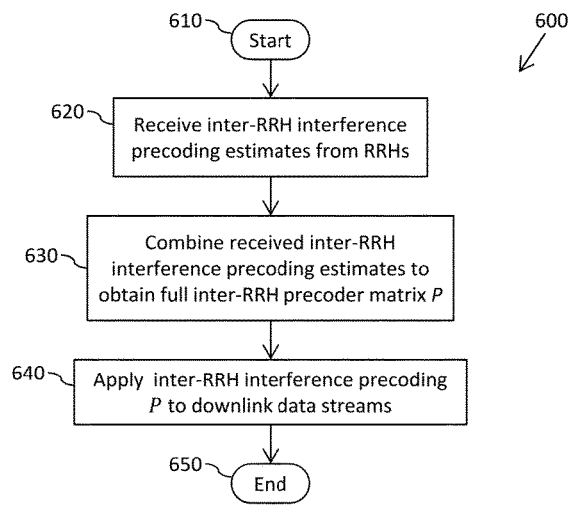
FIG. 6 illustrates a simplified flowchart of a method of performing inter-RRH interference precoding within a base station controller of a distributed antenna system.

Referring now to FIG. 6, there is illustrated a simplified flowchart 600 of a method of performing inter-RRH interference precoding within a base station controller of a distributed antenna system, such as may be implemented within a processing component of the base station controller 310 of the DAS of FIGS. 3 and 4. The method starts at 610 and moves on to 620 where inter-RRH interference precoding estimates are received from each RRH within the distributed antenna system. The received inter-RRH interference precoding estimates are then combined, at 630, to obtain a full inter-RRH interference precoder matrix P. Inter-RRH interference precoding is then applied to downlink data streams for user devices in accordance with the inter-RRH interference precoder matrix P. The method then ends, at 650.

Figure 7:
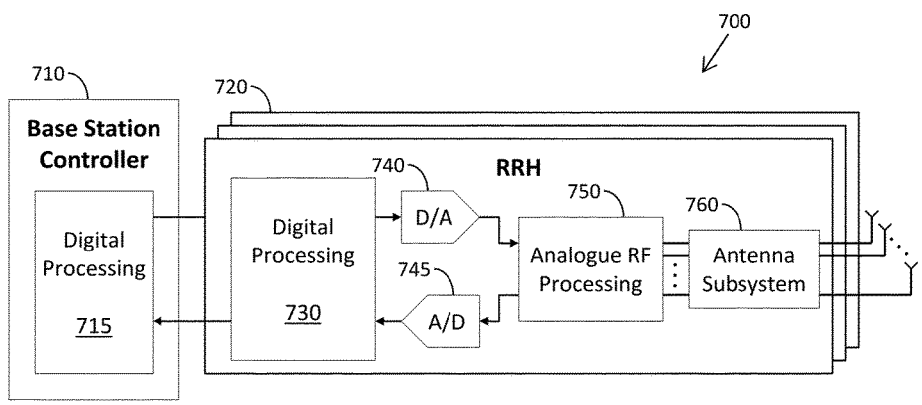
FIG. 7 illustrates a further simplified block diagram of an example of a distributed antenna system.

FIG. 7 illustrates a simplified block diagram of a DAS 700. The DAS 700 includes a base station controller 710 comprising at least one processing component 715 arranged to perform inter-RRH interference precoding, for example in accordance with the method of FIG. 6. The processing component 715 may be arranged to perform addition processing, for example bit-level processing including channel coding, scrambling and interleaving, followed by modulation of data to be transmitted to produce scrambled and modulated codewords, and layer mapping performed on the scrambled and modulated codewords to create a multitude of parallel data streams intended for transmission to one or more users, and to which the inter-RRH interference precoding is applied. The DAS 700 further includes RRH consisting of a plurality of RRHs 720. Each RRH 220 includes a digital processing component 730 arranged to perform digital processing on a subset of data streams received from the base station controller 710, followed by a digital to analogue converter 740 and an analogue processing component 750, before the subset of data streams are finally transmitted via an antenna subsystem 760.

In some examples, the digital processing component 730 is arranged to perform distributed computation of precoding estimates within the DAS 700, for example in accordance with the method of FIG. 5. Accordingly, in such examples the digital processing component 730 of the RRH 720 is arranged to perform channel estimation for each active user device m communicating therewith, based on received uplink signals, to obtain channel estimates $H_{m,i}$ between each active user device m and the RRH 720. Said uplink signals are received via the antenna subsystem 760 of the RRH 720, and forwarded to the digital processing component by the analogue processing component 750 and analogue to digital converter 745. Having obtained the channel estimates $H_{m,i}$ between each active user device m and the RRH 720, the digital processing component 730 then able to compute intra-RRH interference precoding estimates $F_m$ for each active user device m based on the channel estimates $H_{m,i}$, and solve interference-free conditions to obtain inter-RRH interference precoding estimates for each RRH 720 j within the DAS 700. The digital processing component 730 is then able to use the compute intra-RRH interference precoding estimates $F_m$ to perform intra-RRH interference precoding to data streams transmitted to the user devices. The digital processing component 730 is also able to communicate the inter-RRH interference precoding estimates back to the base station controller 710 to enable the base station controller 710 to perform inter-RRH interference precoding.

For simplicity and ease of understanding, the digital processing components 715, 730 of the base station controller 710 and RRH 720 have been illustrated as consisting of a single functional block. However, it will be appreciated that each digital processing component 715, 730 may be implemented by way of a plurality of hardware elements, for example a plurality of processor cores, accelerator modules, memory modules etc.

Furthermore, it will be appreciated that the invention is not limited to the distributed computation of precoding estimates being performed solely within digital processing functionality of RRHs, and it is contemplated that at least some of the operations herein described for performing the distributed computation of precoding estimates may equally be performed, at least in part, within analogue processing functionality, for example within the analogue processing component 750 illustrated in FIG. 7. Equally, it is contemplated that performing intra-RRH precoding may be performed within either digital processing functionality of the RRH (e.g. the digital processing component 730 of the RRH 720 of FIG. 7) or analogue processing functionality of the RRH (e.g. the analogue processing component 750 of the RRH 720 of FIG. 7), or a combination of the two.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A remote radio head apparatus (RRH) within a distributed antenna system (DAS), the RRH configured to perform distributed computation of precoding estimates within the DAS and comprising:
 a receiver component arranged to receive uplink signals from active user devices; and
 a processing component arranged to:
  perform channel estimation for each active user device m, based on the received uplink signals, to obtain channel estimates $H_{m,i}$ between each active user device m and the RRH;
  compute intra-RRH interference precoding estimates $F_m$ for each active user device m based on the channel estimates $H_{m,i}$;
  solve interference-free conditions to obtain inter-RRH interference precoding estimates for each RRH j within the DAS, wherein the interference-free conditions comprise one of $$H_{m,i}F_m P_{j,(i+k) mod N_{RRH}} = 0; \text{ and}$$

$$P_{j,(i+k) mod N_{RRH}} = \operatorname{argmin}(|H_{ij}F_j P_{j,(i+k) mod N_{RRH}}|_F).$$

2. The RRH of claim 1 further arranged to communicate the inter-RRH interference precoding estimates to a base station controller of the DAS.

3. The RRH of claim 1, wherein the processing component is arranged to perform the channel estimation using one of:
 a different pilot subcarrier in the uplink transmission from each transmit antenna of the user device;
 a different cyclic shift for the uplink channel from each transmit antenna of the user device; and
 orthogonal cover codes for the uplink channels from the transmit antennas of the user device.

4. The RRH of claim 1, wherein the processing component is arranged to compute intra-RRH interference precoding estimates $F_m$ using one of:
 singular value decomposition;
 maximum ratio combining/transmit;
 zero forcing; and
 minimum mean square error.

5. The RRH of claim 1 further arranged to apply the estimated intra-RRH interference precoding $F_m$ to downlink data streams for the user devices.

6. A distributed antenna system (DAS) comprising:
 a base station controller; and
 a plurality of remote radio head apparatuses (RRH) coupled to the base station controller, wherein
  each RRH is arranged to perform distributed computation of precoding estimates within the DAS;
  each RRH comprises a receiver component arranged to receive uplink signals from active user devices;
  each RRH further comprises a processing component arranged to:
   perform channel estimation for each active user device m, based on the received uplink signals, to obtain channel estimates $H_{m,i}$ between each active user device m and the RRH;
   compute intra-RRH interference precoding estimates $F_m$ for each active user device m based on the channel estimates $H_{m,i}$;
   solve interference-free conditions to obtain inter-RRH interference precoding estimates for each RRH j within the DAS, wherein the interference-free conditions comprise one of $$H_{m,i}F_m P_{j,(i+k) mod N_{RRH}} = 0; \text{ and}$$

$$P_{j,(i+k) mod N_{RRH}} = \operatorname{argmin}(|H_{ij}F_j P_{j,(i+k) mod N_{RRH}}|_F).$$

7. The DAS of claim 6, wherein each RRH is further arranged to communicate the inter-RRH interference precoding estimates to a base station controller of the DAS.

8. The DAS of claim 7, wherein the base station controller is arranged to combine inter-RRH interference precoding estimates received from each of the plurality of RRHs to obtain an inter-RRH interference precoding matrix P, and to apply inter-RRH interference precoding P to downlink data streams for the user devices.

9. The DAS of claim 6, wherein the processing component of each RRH is arranged to perform the channel estimation using one of:
 a different pilot subcarrier in the uplink transmission from each transmit antenna of the user device;
 a different cyclic shift for the uplink channel from each transmit antenna of the user device; and
 orthogonal cover codes for the uplink channels from the transmit antennas of the user device.

10. The DAS of claim 6, wherein the processing component of each RRH is arranged to compute intra-RRH interference precoding estimates $F_m$ using one of:
 singular value decomposition;
 maximum ratio combining/transmit;
 zero forcing; and
 minimum mean square error.

11. The DAS of claim 6, wherein each RRH is further arranged to apply the estimated intra-RRH interference precoding $F_m$ to downlink data streams for the user devices.

12. A method of performing distributed computation of precoding estimates within a distributed antenna system, DAS; the method comprising:
 receiving, by a remote radio head apparatus (RRH), uplink signals from active user devices;
 performing, by the RRH, channel estimation for each active user device m, based on the received uplink signals, to obtain channel estimates $H_{m,i}$ between each active user device m and the RRH;
 computing, by the RRH, intra-RRH interference precoding estimates $F_m$ for each active user device m based on the channel estimates $H_{m,i}$;
 solving, by the RRH, interference-free conditions to obtain inter-RRH interference precoding estimates for each RRH j within the DAS, wherein the interference-free conditions comprise one of $$H_{m,i}F_m P_{j,(i+k) mod N_{RRH}} = 0; \text{ and}$$

$$P_{j,(i+k) mod N_{RRH}} = \operatorname{argmin}(|H_{ij}F_j P_{j,(i+k) mod N_{RRH}}|_F).$$

13. The method of claim 12 further comprising communicating the inter-RRH interference precoding estimates to a base station controller of the DAS.

14. The method of claim 13 further comprising, at the base station controller, combining inter-RRH interference precoding estimates received from each of a plurality of RRHs to obtain an inter-RRH interference precoding matrix P, and applying inter-RRH interference precoding P to downlink data streams for the user devices.

15. The method of claim 12, wherein the channel estimation is performed using a different pilot subcarrier in the uplink transmission from each transmit antenna of the user device.

16. The method of claim 12 comprising computing intra-RRH interference precoding estimates $F_m$ using one of:
   singular value decomposition;
   maximum ratio combining/transmit;
   zero forcing; and
   minimum mean square error.

17. The method of claim 12 further comprising applying the estimated intra-RRH interference precoding $F_m$ to downlink data streams for the user devices.

\* \* \* \* \*